United States Patent
Chen et al.

(10) Patent No.: US 11,070,308 B2
(45) Date of Patent: Jul. 20, 2021

(54) MITIGATION OF PARTIAL BAND JAMMING FOR SATELLITE COMMUNICATIONS

(71) Applicant: Hughes Network Systems, LLC, Germantown, MD (US)

(72) Inventors: Liping Chen, Bethesda, MD (US);
Lin-Nan Lee, Potomac, MD (US);
Bassel F. Beidas, Alexandria, VA (US);
Donglei Fan, College Park, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/643,418

(22) Filed: Jul. 6, 2017

(65) Prior Publication Data

US 2019/0013892 A1 Jan. 10, 2019

(51) Int. Cl.
*H04K 3/00* (2006.01)
*H04B 7/185* (2006.01)
*H04B 1/71* (2011.01)
*H04L 27/20* (2006.01)

(52) U.S. Cl.
CPC ............... *H04K 3/228* (2013.01); *H04B 1/71* (2013.01); *H04B 7/18513* (2013.01); *H04L 27/2067* (2013.01)

(58) Field of Classification Search
CPC .............. H04K 3/228; H04L 27/2067; H04B 7/18513; H04B 1/71
See application file for complete search history.

(56) References Cited

U.S. PATENT DOCUMENTS

| | | | | |
|---|---|---|---|---|
| 4,970,592 | A | * 11/1990 | Becker | H04N 7/04 348/496 |
| 5,325,188 | A | * 6/1994 | Scarpa | H04N 5/21 348/624 |
| 5,758,275 | A | * 5/1998 | Cox | H04B 1/1036 455/306 |
| 9,203,431 | B2 | 12/2015 | Lee et al. | |

(Continued)

OTHER PUBLICATIONS

U. Lambrette, M. Speth and H. Meyr, "OFDM burst frequency synchronization by single carrier training data," in IEEE Communications Letters, vol. 1, No. 2, pp. 46-48, Mar. 1997.*

(Continued)

*Primary Examiner* — Sam K Ahn
*Assistant Examiner* — Amneet Singh
(74) *Attorney, Agent, or Firm* — Bejin Bieneman PLC

(57) ABSTRACT

A transmitter, including a signal processor programmed to generate, based on input serial data, for each of an integer number of subcarriers mutually orthogonal to each other, a respective first parallel data stream. The signal processor is further programmed to modulate each of the integer number of subcarriers respectively with the respective parallel stream to generate the integer number of data-modulated subcarriers. The signal processor is further programmed to modulate a single carrier occupying a same bandwidth as the integer number of subcarriers with a unique word and one or more pilot symbols to generate a second signal. The signal processor combines the first signal and second signal to generate a third signal. The signal processor generates an output signal by applying a transmit filter to the third signal.

17 Claims, 12 Drawing Sheets

(56) References Cited

U.S. PATENT DOCUMENTS

| | | | |
|---|---|---|---|
| 2002/0141356 A1* | 10/2002 | Beidas | H04B 7/2125 370/324 |
| 2004/0258184 A1 | 12/2004 | Liu | |
| 2006/0176802 A1* | 8/2006 | Ko | H04L 27/2695 370/208 |
| 2009/0086864 A1* | 4/2009 | Komninakis | H04B 1/109 375/346 |
| 2009/0175228 A1* | 7/2009 | Kimura | H04L 5/0007 370/329 |
| 2012/0230445 A1 | 9/2012 | Kato | |
| 2015/0222322 A1 | 8/2015 | Moffatt et al. | |
| 2016/0254937 A1* | 9/2016 | Bayesteh | H04L 1/0054 375/341 |
| 2018/0123636 A1* | 5/2018 | Safavi | H04B 1/707 |

OTHER PUBLICATIONS

Jun Mashino et al: "Subcarrier Suppressed Transmission Scheme for Satellite/Terrestrial Integrated Mobile Communication System", Vehicular Technology Conference Fall (VTC 2010—Fall), 2010 IEEE 72NDD, IEEE, Piscataway, NJ, USA, Sep. 6, 2010, pp. 1-5, XP031770399, ISBN: 978-1-4244-3573-9.

Lin-Nan Lee et al: "Scrambled Code Multiple Access Waveform for Micro Satellite Terminals", Military Communications Conference, 2012-MILCOM 2012, IEEE, Oct. 29, 2012, pp. 1-6, XP032315494, DOI: 10.1109/MILCOM.2012.6415683; ISBN: 978-1-4673-1729-0.

Invitation to Pay Additional Fees and, Where Applicable, Protest Fee for PCT/US2017/057290 dated Feb. 20, 2018 (13 pages).

M. Eroz and L. Lee, "Scrambled coded multiple access," Proceeding of Vehicle Technology Conference, Taipei, Taiwan, 2011.

R. J. F. Fang, M. Eroz, and N. Becker, "Data collection and SCADA over GEO-MSS satellites using spread SCMA," Proc. of the International Workshop on Satellite and Space Communications, pp. 441-445, Sep. 2009.

L. Lee, M. Eroz, L. Chen, and R. Gopal, "Scrambled Code Multiple Access Waveform for Micro Satellite Terminals," Proc. of Military Communications, MILCOM'12, Orlando, Florida, Oct. 2012.

Schmidl, T.M.; Cox, D.C., "Robust frequency and timing synchronization for OFDM," Communications, IEEE Transactions on, vol. 45, No. 12, pp. 1613-1621, Dec. 1997.

Van De Beek, J.J.; Sandell, M.; Borjesson, P.O., "ML estimation of time and frequency offset in OFDM systems," Signal Processing, IEEE Transactions on, vol. 45, No. 7, pp. 1800-1805, Jul. 1997.

Non-Final Office Action dated May 8, 2018 for U.S. Appl. No. 15/374,418 (24 pages).

* cited by examiner

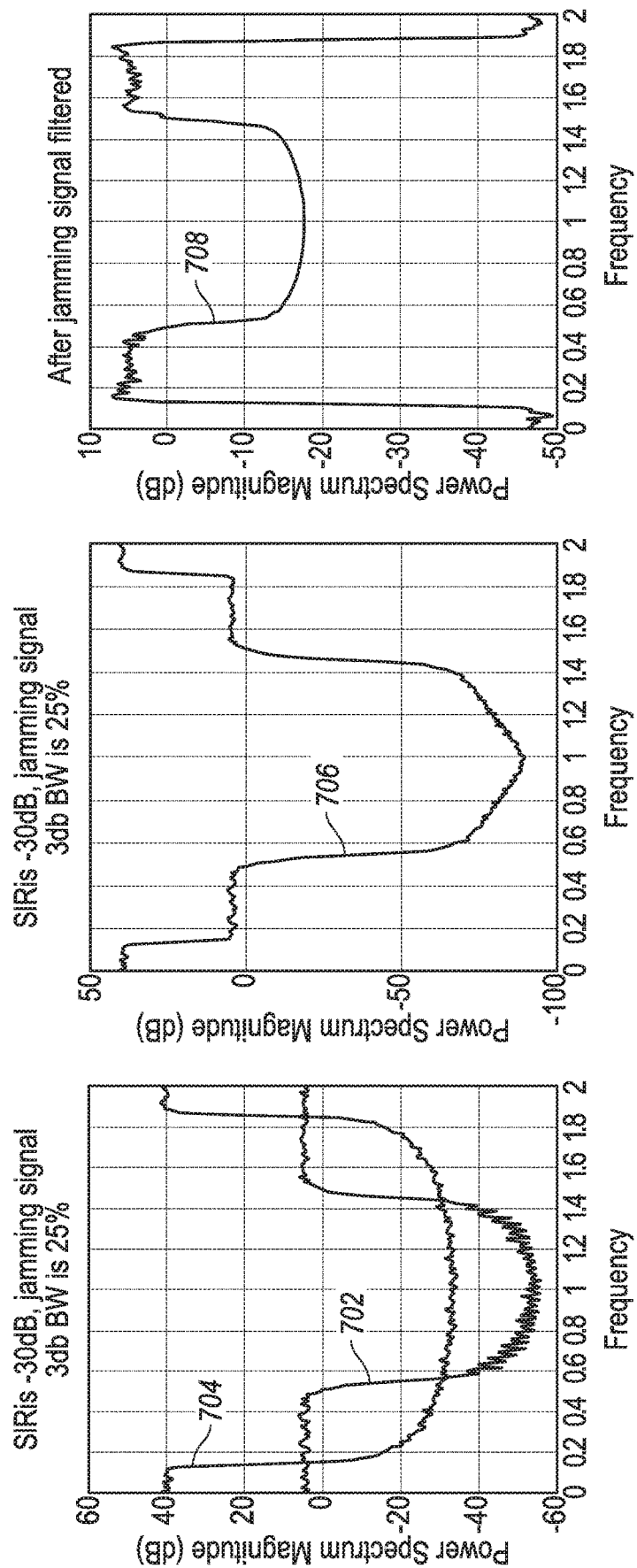

MITIGATION OF PARTIAL BAND JAMMING FOR SATELLITE COMMUNICATIONS

BACKGROUND

Hostile sources can disrupt and disable satellite communications links with intentional jamming. Narrowband interference from other commercial satellite networks and terrestrial service providers can also disrupt transmissions. This problem is compounded as terrestrial service providers are demanding a share of the spectrum traditionally used for satellite communications. Jamming effectiveness in disrupting satellite communications increases with the power of the jamming signal. Partial-band jamming is a technique in which jamming signal power is applied to only a portion of the system bandwidth (BW) to boost the strength of the jamming signal power within the targeted bandwidth. In such a case, the increased effectiveness of the jamming depends directly on the fraction of jamming BW and the signal BW.

SUMMARY

An exemplary system includes a transmitter including a first signal processor programmed to, based on input serial data, generate, for each of an integer number of subcarriers mutually orthogonal to each other, a respective first data parallel stream. The signal processor is further programmed to modulate each of the integer number of subcarriers with the respective first parallel data stream to generate a first signal including an integer number of data-modulated subcarriers, modulate a single carrier, the single carrier occupying a same bandwidth as the integer number of subcarriers, with a unique word and one or more pilot symbols to generate a second signal, combine the first signal and second signal to generate a third signal; and generate an output signal by applying a transmit filter to the third signal.

In another example the first signal processor is programmed to transmit the output signal to a second signal processor.

In another example, the first signal processor is programmed to modulate the integer number of subcarriers respectively with the respective first parallel data streams by applying an inverse fast Fourier transform (IFFT) to the integer number of first parallel data streams.

In another example, the first signal processor is programmed to scramble the input serial data prior to generating the respective first parallel data streams.

According to another example, applying the transmit filter includes applying an interpolation filter.

In another example, the signal processor is programmed to generate, prior to modulating the integer number of subcarriers respectively with the respective first parallel data streams, a fourth signal including the input serial data and one or more pilot symbols. The signal processor is further programmed to scramble the fourth signal to generate a fifth signal including one or more scrambled pilot symbols and scrambled input serial data, generate the respective first parallel data streams based on the scrambled input serial data from the fifth signal, and include in the output signal the one or more scrambled pilot symbols from the fifth signal, whereby the one or more scrambled pilot symbols modulate the single carrier.

According to another example, the one or more pilot symbols are modulated according to one of BPSK and QPSK modulation, each of the one or more pilot symbols having a respective value that is predefined and stored in respective memories of the transmitter and a receiver.

According to another example, the unique word includes a plurality of symbols modulated according to one of BPSK and QPSK modulation.

According to another example, the first signal processor is programmed, when generating the third signal, to insert the one or more pilot symbols periodically within the input serial data, with a period of pilot symbol insertion based on at least one of: (1) an operating level of signal-to-noise ratio, (2) a modulation choice, (3) a spreading factor, (4) a jamming signal bandwidth, and (5) a jamming-to-signal ratio.

In another example, the first signal processor is further programmed to specify a length of the unique word based on at least one of: (1) an operating level of signal-to-noise ratio, (2) a modulation choice, (3) a spreading factor, (4) a jamming signal bandwidth, and (5) a jamming-to-signal ratio.

An exemplary system includes a receiver including a signal processor programmed to receive a first signal including a unique word and one or more pilot symbols modulating a single carrier, and an integer number of data-modulated subcarriers mutually orthogonal to each other, each of the integer number of data-modulated subcarriers including a subcarrier modulated by a respective first parallel data stream, wherein the integer number is a number of subcarriers included in the single carrier. The signal processor is further programmed to determine a frequency segment of the first signal subject to interference, generate a second signal by filtering out the frequency segment of the first signal subject to interference, perform a first adjustment of a carrier frequency of the second signal based on the unique word; and extract the first parallel data streams respectively from the integer number of data-modulated subcarriers.

In another example, the signal processor is programmed to apply a notch filter to filter out the frequency segment of the first signal subject to interference. According to this example, applying the notch filter may include determining a center frequency and bandwidth of the frequency segment subject to interference; and matching a center frequency and bandwidth of the notch filter to the center frequency and bandwidth of the frequency segment.

In another example, the signal processor is programmed to extract the first parallel data streams respectively from the integer number of data modulated subcarriers by applying a fast Fourier transform (FFT) to each of the integer number of data modulated subcarriers.

In another example, the signal processor is programmed to combine the extracted first parallel data streams to form a serial data stream, and descramble the serial data stream.

In another example, the signal processor is programmed to perform the first adjustment of the carrier frequency by performing a first carrier frequency estimation for the second signal based on the unique word, and removing the first estimated carrier frequency from the second signal.

In another example, the signal processor further programmed to detect the unique word in the second signal based on a correlation between a known unique word and a portion of the second signal above a correlation threshold. According to this example, the signal processor may be further programmed to adjust a gain of a receiver input based on an amplitude of the unique word in the second signal.

In another example, the signal processor is programmed to descramble, after removing the first estimated carrier frequency; the unique word and the one or more pilot symbols, and perform a second carrier frequency estimation and removal based on the unique word and one or more pilot symbols.

In another example, the signal processor is programmed to perform the second carrier frequency removal prior to extracting the first parallel data streams respectively from the integer number of data-modulated subcarriers to generate N parallel data streams.

In another example, the signal processor is programmed to determine the frequency segment of the first signal subject to interference by determining an adaptive threshold based on an amplitude of at least one frequency segment of the first signal not subject to interference and an amplitude of the frequency segment of the first signal subject to interference.

An exemplary system includes a transmitter and a receiver. The transmitter includes a first signal processor programmed to, based on input serial data, generate, for each of an integer number of subcarriers mutually orthogonal to each other, a respective first parallel data stream. The processor is further programmed to modulate each of the integer number of subcarriers respectively with the respective first parallel data stream to generate a first signal including the integer number of data-modulated subcarriers, modulate a single carrier, the single carrier occupying a same bandwidth as the integer number of subcarriers, with a unique word and one or more pilot symbols to generate a second signal, combine the first signal and the second signal to generate a third signal; and generate an output signal by applying a transmit filter to the third signal.

The receiver includes a second signal processor programmed to receive the output signal including the unique word and one or more pilot symbols modulating the single carrier, and the integer number of data-modulated subcarriers. The second signal processor is further programmed to determine a frequency segment of the output signal subject to interference, generate a fourth signal by filtering out the frequency segment of the output signal subject to interference, perform an adjustment of a carrier frequency of the fourth signal based on the unique word and extract the integer number of first parallel streams respectively from the N data-modulated subcarriers.

DRAWINGS

FIG. 7a is a graph showing exemplary power spectrum plots of a desired signal and a jamming signal.

FIG. 7b is a graph showing an exemplary power spectrum plot of a combined signal including the desired signal and jamming signal of FIG. 7a.

FIG. 7c is a graph showing an exemplary power spectrum plot of the combined signal of FIG. 7b after a notch filter.

FIG. 8a is a graph showing exemplary power spectrum plots of a desired signal and a jamming signal.

FIG. 8b is a graph showing an exemplary power spectrum plot of a combined signal including the desired signal and jamming signal of FIG. 8a.

FIG. 8c is a graph showing an exemplary power spectrum plot of the combined signal of FIG. 8b after a notch filter.

DETAILED DESCRIPTION

Introduction

Figure 1:
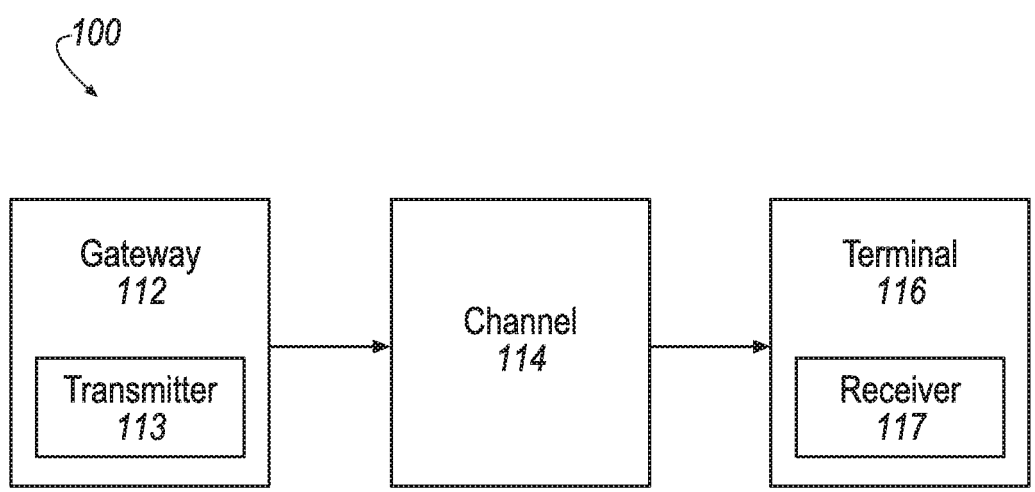
FIG. 1 is a block diagram of an exemplary system for satellite transmissions including orthogonal frequency division multiplexing of a data portion of a transmitted signal.

In a first example, as shown in FIG. 1, a system 100 to improve resilience against single or multiple jamming signals in the bandwidth occupied by a desired signal by employs orthogonal frequency division multiplexing (OFDM)-like signaling. Specifically, the system 100 applies OFDM-like signaling to Scrambled Code Multiple Access (SCMA) to gain anti-jamming capability. SCMA is a single-carrier scheme, previously designed to allow multiple users to coexist in the same time and bandwidth resources in a non-orthogonal manner. Robust communications is achieved there by using a group of Forward Error Correction (FEC) coding schemes. The system 100 maintains the SCMA's inherent tolerance to low levels of operating signal-to-noise ratio (SNR), but introduces resilience to partial-band interference, by utilizing OFDM-like signaling.

In systems employing OFDM-like signaling, a portion, or all of a transmission is divided into N sets of symbols for transmission where N is a number of narrowband subcarriers available for transmission. The N subcarriers are bundled contiguously to form a single wide-band transmit signal. The term subcarrier, as used herein, refers to a narrowband subcarrier included in the single wide-band signal. In OFDM-like signaling, the narrowband subcarriers are orthogonal to one another.

Each of the N sets of symbols is used to modulate, respectively, a separate subcarrier prior to transmission. At a receiver, the sets of symbols are extracted from the respective subcarriers. In the disclosed system 100, the data portion of a transmission is divided into the N sets of symbols for transmission by the respective N subcarriers, while additional symbols in the signal used for synchronization are transmitted as a single carrier signal occupying the same bandwidth, where N is an integer number. The symbols used for synchronization include Unique Words (UW) and pilot symbols, discussed in additional detail below. The Unique Words and pilot symbols are not OFDM modulated. Rather, the Unique Words and pilot symbols are the binary phase-shift keying (BPSK) and quadrature phase shift keying (QPSK) symbols defined in an SCMA waveform.

SCMA is a non-orthogonal, multiple access waveform that allows different users to share the same bandwidth and time slots by employing user specific scramblers. In the following description SCMA is employed as a single access waveform capable of operating under extremely noisy channels instead of a multiple access waveform, although generalization to multiple access is also possible. The scrambling sequence can be a "Gold" or "M" sequence, or any other sequence with good auto-correlation properties. An example SCMA waveform is presented below in reference to FIG. 3.

The system 100 utilizes a multiple access scheme for communications between a gateway 112 and a terminal 116 that functions well under low levels of operating SNR and partial-band jamming with high jamming-to-signal ratio (JSR). As shown in FIG. 1, the gateway 112 includes a transmitter 113 programmed to transmit OFDM-like SCMA signals and the terminal 116 includes a receiver 117 programmed to receive the transmissions.

An OFDM-SCMA waveform keeps a unique word (UW) and pilot symbols in the time domain, and allows the data to modulate narrowband subcarriers, by implementing an N-point inverse fast Fourier transform (IFFT) at the transmitter (N=number of narrowband subcarriers). A UW is a known sequence of symbols that can be used by the receiver 117 in the terminal 116 to synchronize the reception of a transmitted SCMA signal by the receiver 117. A pilot symbol is modulated according to BPSK or QPSK modulation and has a value that is predefined and known to the transmitter 113 and the receiver 117. The pilot symbols 306 may be stored, for example, in the respective memories of the transmitter 113 and receiver 117. Types of modulation that may be used for the pilot symbols include binary phase-shift keying (BPSK) and quadrature phase-shift keying (QPSK). Pilot symbols may also be referred to as "pilots" herein.

The received SCMA signal may include one or more jamming signals that interfere with a portion of the SCMA signal's bandwidth (BW). The portion of the SCMA signal's bandwidth subject to interference may be referred to herein as the frequency segment subject to interference, or the interfered with frequency segment. In order to improve resilience to jamming, the receiver 117 detects the jamming signal's center frequency and BW based on performing fast Fourier transform (FFT) and correspondingly selects an appropriate notch filter to filter out the jamming signal. After the jamming signal is filtered out, timing, frequency and phase offsets can be recovered based on the UW and pilot symbols which are in the time domain. Upon recovering the timing, frequency and phase offsets, the receiver 117 extracts the data from the OFDM-SCMA waveform, as described in additional detail below.

The UW length and number of pilot symbols can be parameterized according to different operating levels of SNR, modulation choice, jamming-to-signal ratio (JSR), and jamming bandwidth. Since the data part modulates a number of orthogonal subcarriers, the subcarriers which are not contaminated by the jamming signal can be recovered by N-point FFT. The OFDM-SCMA receiver will rely on adequate channel interleaving and traditional SCMA FEC's powerful error correction ability to recover the lost information caused by a partial-band jammer.

The system 100 may select appropriate codes based on the received SNR and the bandwidth taken up by the partial-band jammer in order to maintain reliable communications at the theoretically best throughput. The system 100 further utilizes Adaptive Coding and Modulation (ACM) among the available codes within the SCMA waveform to further optimize throughput.

System Elements

Still referring to FIG. 1, the gateway 112 is a signal processor including a memory and a processor, the processor programmed to execute programs stored by the memory. A signal processor, as used herein, may be implemented as one or more application specific integrated circuits (ASICs), one or more field-programmable gate arrays (FPGAs), one or more digital signal processors (DSPs), one or more graphics processing units (GPU), one or more general purpose computers, or a combination thereof. The gateway 112 includes a transmitter 113 for transmitting, via a channel 114, signals to a terminal 116.

The transmitter 113 may include one or more processors and memories, the memories storing software programming executable by the processor(s). Additionally or alternatively, the transmitter 113 can include hardware and/or firmware. The transmitter 113 is programmed to apply OFDM-like signaling to Scrambled Code Multiple Access (SCMA) to gain anti-jamming capability. The transmitter 113 generates a waveform that keeps a unique word (UW) and pilot symbols in the time domain and allows the data to modulate narrowband subcarriers.

An exemplary process 200 for transmitting SCMA signals with the UW and pilots transmitted by a traditional single carrier modulation, and data divided into N sets of data and transmitted by N narrowband subcarriers, is described below. Each subcarrier is modulated with a conventional modulation scheme at a slower rate to achieve an equivalent data rate to that which a conventional single carrier modulation scheme can offer.

The channel 114 represents one or more mechanisms for providing radio frequency communications between two or more signal processors such as the gateway 112 and the terminal 116. The channel 114 can include, for example, a satellite including one or more repeaters. The repeaters receive signals from, e.g., the gateway 112, increase a power level of the received signal, and retransmit the signals to one or more terminals 116. The channel 114 may perform other operations such as filtering, frequency translation, etc.

Due, for example, to noise, and non-linear interference effects, the SCMA signals may be attenuated, or otherwise altered, by the transmission channel 114. The system 100 may utilize coding to combat noise and other issues associated with the channel 114, such as forward error correction (FEC) codes.

Note that, although the system 100 is described herein in reference to satellite communications, the presently disclosed teachings could apply to other radio frequency communications subject to narrowband interference.

The terminal 116 is a signal processor and is programmed to receive communications from the gateway 112 via a channel 114.

The terminal 116 includes a receiver 117 for receiving signals from the gateway 112 transmitter 113. The terminal 116 receiver 117 may include one or more processors and memories, the memories storing software programming executable by the processor(s). Additionally or alternatively, the receiver 117 can include hardware and/or firmware. The receiver 117 is programmed to receive the OFDM-like SCMA signaling and reconstruct the SCMA signal. The receiver 117 is further programmed, as described in detail below, to filter out frequency segments associated with subcarriers subject to interference.

Initially the receiver 117 will apply an M-point FFT to the received signal at multiple samples per symbol. The receiver 117 will determine the bandwidth and center frequency of the frequency segment subject to interference. In some cases, there may be more than one frequency segment subject to interference. In that case, each frequency segment subject to interference will be treated in the same manner.

The receiver 117 will apply an appropriate notch filter to remove each frequency segment of the signal subject to interference. After the frequency segment or segments subject to interference are filtered out, the receiver 117 makes first timing, frequency, and phase estimations and corresponding adjustments at multiple samples per symbol. Following the first adjustments, the received samples are decimated to one sample per symbol (1SPS) and the receiver 117 makes second timing, frequency and phase estimations and corresponding adjustments. After second timing, frequency and phase adjustments, the receiver 117 extracts data content from the SCMA signal. The first frequency estimation is for coarse frequency estimation and the second frequency estimation is for fine frequency estimation. The first and second adjustments include removal of the respective estimated carrier frequency.

An exemplary process 600, for receiving SCMA signals with the UW and pilots in the time domain, and data modulated narrowband subcarriers, is described in detail below.

The description that follows will describe a transmitter 113 in a gateway 112 transmitting signals to a receiver 117 in a terminal 116 via the channel 114. Other transmitter/receiver pairs, such as a transmitter in the terminal 116 transmitting signals via the channel 114 to a receiver in the gateway 112, may also be programmed to utilize OFDM-like signaling with a UW and pilots in the time domain and data modulated narrow band OFDM subcarriers.

Figure 2:
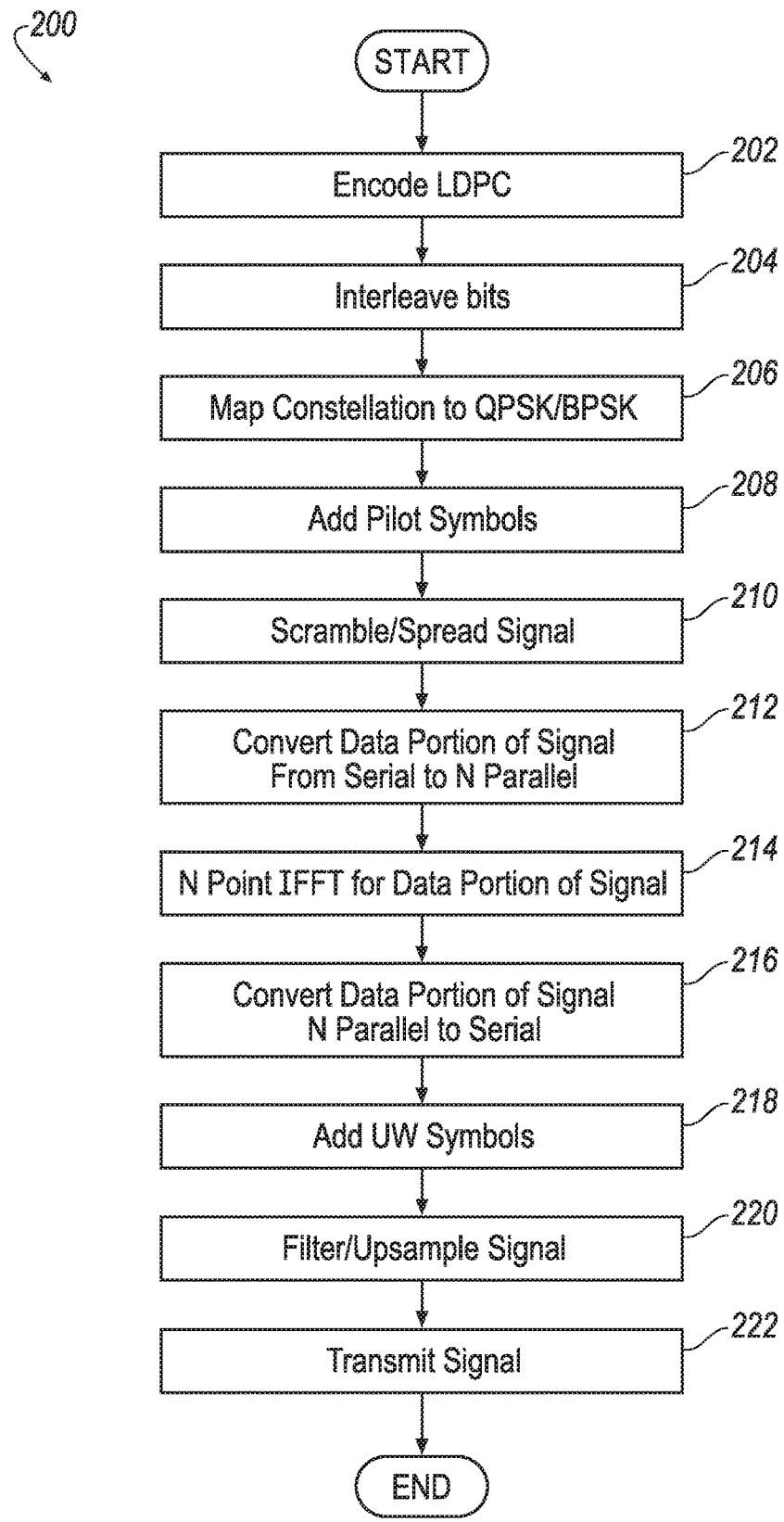
FIG. 2 is a diagram of an exemplary process for transmitting a signal via satellite including orthogonal frequency division multiplexing of the data portion of the signal.

FIG. 2 is a diagram of an exemplary process 200 for generating, by a transmitter 113, an SCMA signal 300 (FIG. 3) including orthogonal frequency division multiplexing of the data portion 304 (FIG. 3) of the SCMA signal, and transmitting the SCMA signal to a receiver 117 via the channel 114. The process 200 starts in a block 202.

In the block 202, the transmitter 113 is programmed to receive a first source signal for transmission via the channel 114 to the receiver 117. The first source signal includes input serial data and further includes a unique word. The transmitter 113 generates an encoded vector signal from the first source signal to include error correction coding. The error correction coding adds information to the source signal to reduce information loss at the receiver 117. For SCMA-based communications, the transmitter 113 may employ, for example, a low rate k/n low-density parity-check (LDPC) code with, for example, n=9 and k=1, 2, 3, 4, 5, and 6.

Upon encoding the first source signal including error correction coding, the process 200 continues in a block 204.

In the block 204, the transmitter 113 is programmed to interleave data from the encoded vector signal generated in the block 202. Upon interleaving the data, the process 200 continues in a block 206.

In the block 206, the transmitter 113 is programmed to modulate the bit interleaved signal from the block 204. The transmitter 113 generates a vector of symbols based on the encoded, bit interleaved signal. Each component of this vector is drawn from a complex-valued digital constellation. Two examples of constellations applicable to SCMA-based communications are binary phase-shift keying (BPSK) and quadrature phase-shift keying (QPSK). Upon modulating the bit interleaved signal, the process 200 continues in a block 208.

In the block 208, the transmitter 113 is programmed to insert one or more pilot symbols 306 (FIG. 3) into the modulated, time domain signal from the block 206. The one or more pilot symbols 306 may be used by the receiver 117 to synchronize reception of the SCMA signal 300 in the time domain.

As described above, a pilot symbol 306 is either a BPSK or QPSK modulated complex symbol, each pilot symbol 306 having a respective value that is predefined and known to the transmitter 113 and receiver 117. Each pilot symbol may have a different value. The pilot symbols 306 are inserted with a certain spacing which depends on how fast the channel 114 changes. Selecting the spacing of pilot symbols 306 in the SCMA signal 300 is a tradeoff between acquisition accuracy and throughput. Decreasing the spacing of pilot symbols 306 improves the acquisition accuracy, but reduces throughput. Upon completing the block 208, the process 200 continues in a block 210.

In the block 210, the transmitter 113 is programmed to scramble, as is known, the SCMA signal 300, including pilots 306, from the block 208, resulting in a version of the SCMA signal 300 including scrambled pilot symbols 306 and scrambled input serial data included in the data portions 304. The transmitter 113 may further be programmed to frequency spread the SCMA signal 300. Upon scrambling and/or frequency spreading the vector of symbols, the process 200 continues in a block 212.

In the block 212, the transmitter 113 is programmed to convert the data portion 304 of the encoded signal from the block 208 into N parallel data streams, where N is the FFT size. The N parallel data streams are used respectively as frequency domain bins for an IFFT. Upon generating the N parallel data streams, the process 200 continues in a block 214.

In the block 214, the transmitter 113 performs an inverse fast Fourier transform (IFFT) on each of the N parallel data streams. Each of the N parallel data streams modulates respectively one of the N subcarriers. Upon performing the IFFT, the process continues in a block 216.

In the block 216, the transmitter 113 converts the output of the IFFT from N-parallel streams to a serial data stream. The N data-modulated subcarriers obtained from the IFFT are serialized to create a time-domain signal that replaces the original scrambler/spreader output in a burst. The process continues in a block 218.

In the block 218, the transmitter 113 is programmed to insert one or more Unique Words (UWs) into the signal generated in the block 216. UWs are used for synchronization and include a plurality of BPSK or QPSK modulated symbols. As an example, a 512-symbol frame sync UW made be used for BPSK, or a 256-symbol frame sync second UW for QPSK. The UW may be used to synchronize the FFT operation in the receiver 117 with the IFFT operation in the transmitter 113. As an example, the UW may be designed to achieve acquisition or coarse estimation of some synchronization parameters prior to decimation of the received signal by the receiver 117. The process 200 then continues in a block 220.

In the block 220, the transmitter 113 filters and upsamples the SCMA signal to generate an output signal. The transmitter 113 is programmed to apply a transmit filter such as an interpolation filter to the SCMA signal generated in the block 218. This can be done using a polyphase filter structure. The filter coefficients can follow a root-raised cosine (RRC) shape with low rolloff values. Upon generating the output signal, the process 200 continues in a block 222.

In the block 222, the transmitter 113 transmits the output signal via the transmission channel 114 to the receiver 117. The process 200 ends.

Figure 3:
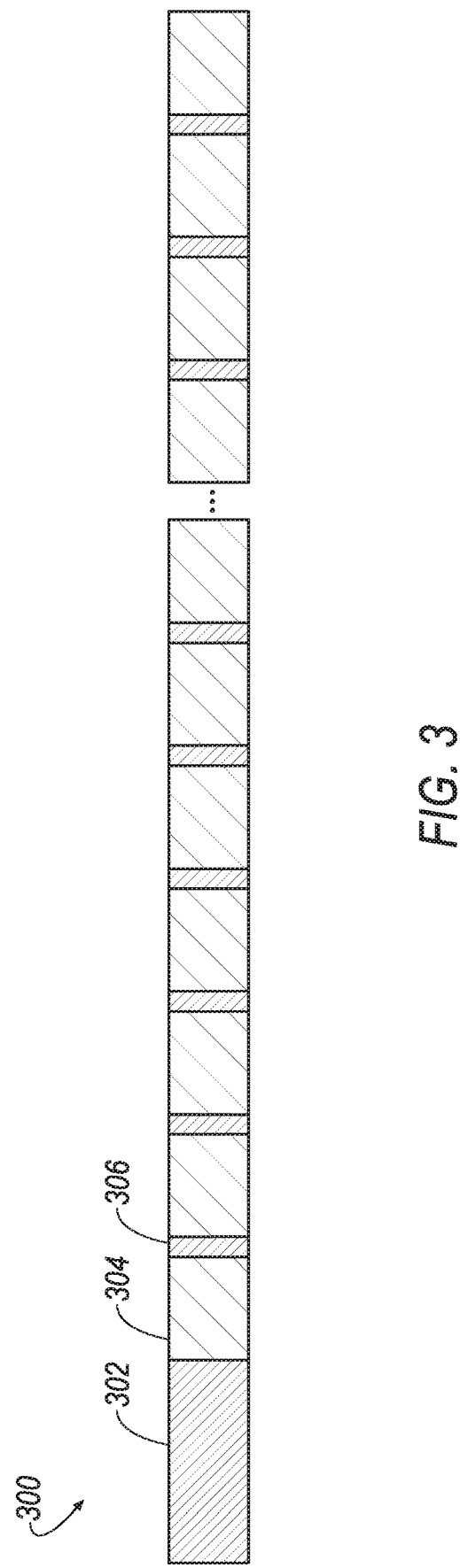
FIG. 3 is a diagram of an exemplary signal including orthogonal frequency division multiplexing of the data portion of the signal.

FIG. 3 is a diagram of an exemplary SCMA signal 300 including orthogonal frequency division multiplexing of the data portion of the signal. As shown in FIG. 3, the SCMA signal 300 signal may be a single burst. The SCMA signal 300 includes a UW 302, one or more data portions 304 and one or more pilots 306.

The UW 302 is complex valued BPSK or QPSK modulated. The UW length is determined by an operating level of signal-to-noise ratio (SNR), modulation selection, spreading factor, jamming signal bandwidth, and jamming to signal ratio (JSR) level of the SCMA signal.

In order to mitigate inter symbol interference (ISI) during synchronization of the SCMA signal caused by filtering out of the jamming signal, it is necessary to increase UW length relative to traditional SCMA transmission. The effects of UW length on UW detection are described in additional detail below.

The one or more data portions 304 include the data modulated subcarriers, after IFFT processing and parallel to serial conversion.

As described above, a pilot symbol 306 is a BPSK or QPSK modulated symbol having a value that is predefined and known to the transmitter 113 and receiver 117. Pilot symbols 306 are inserted every (pilot spacing—1) complex symbols. The pilot spacing is determined by operating level of SNR, modulation choice (e.g., QPSK or BPSK), spreading factor, jamming signal bandwidth, and JSR. Decreasing the pilot spacing (increasing the pilot repetition rate) improves acquisition accuracy at a cost to the system 100 of reduced throughput.

Figure 4:
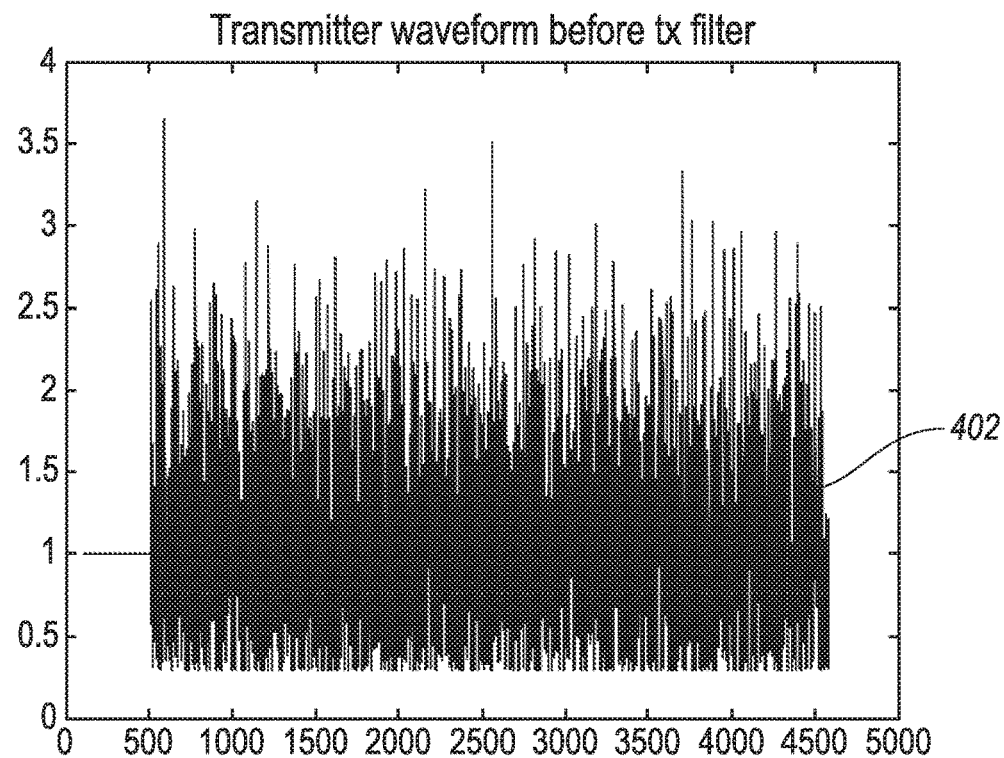
FIG. 4 is a graph showing a plot of an exemplary waveform before transmit filtering.

FIG. 4 is a graph showing a plot of an exemplary OFDM-SCMA waveform 402 before transmit RRC filtering. The UW portion and pilot portions are QPSK constant-amplitude before transmit RRC filtering and the data portion is an OFDM signal which has a high peak to average power ratio (PAPR). The PAPR of the OFDM signal (data portion of the OFDM-SCMA the exemplary waveform 402) disadvantageously increases with an increasing number N of subcarriers.

Figure 5:
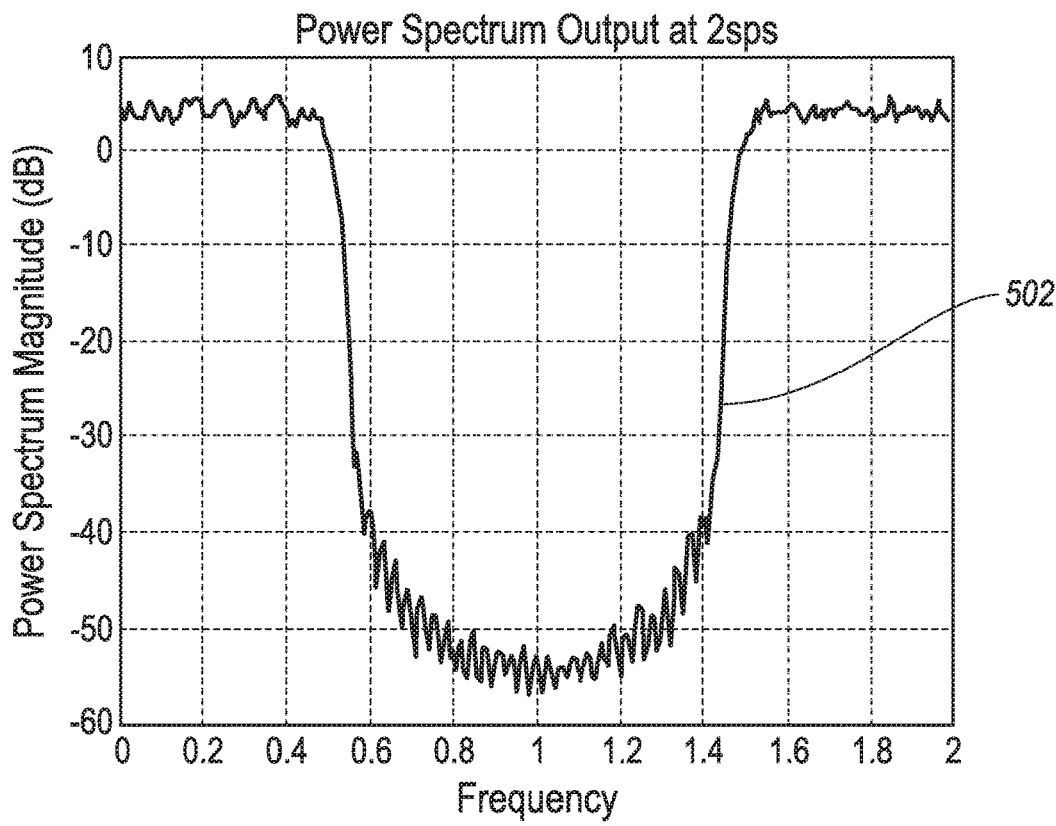
FIG. 5 is a graph showing the power spectrum at two samples per symbol for the exemplary waveform of FIG. 4.

FIG. 5 is a graph showing the power spectrum output at two samples per symbol 502 for the exemplary waveform 402 of FIG. 4.

Figure 6A:
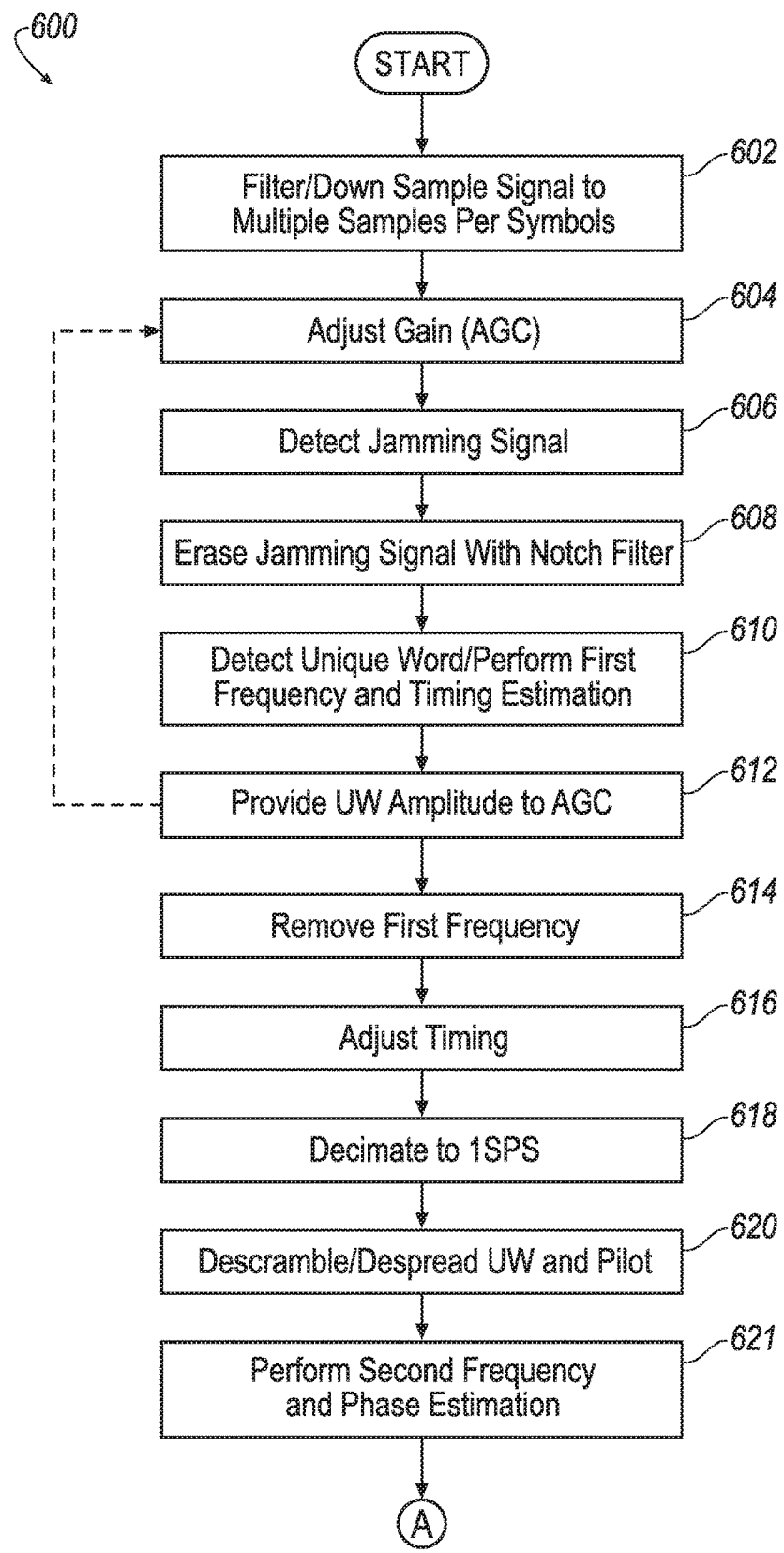
FIGS. 6a and 6b are a diagram of an exemplary process for receiving a signal via satellite including orthogonal frequency division multiplexing of the data portion of the signal.
Figure 6B:
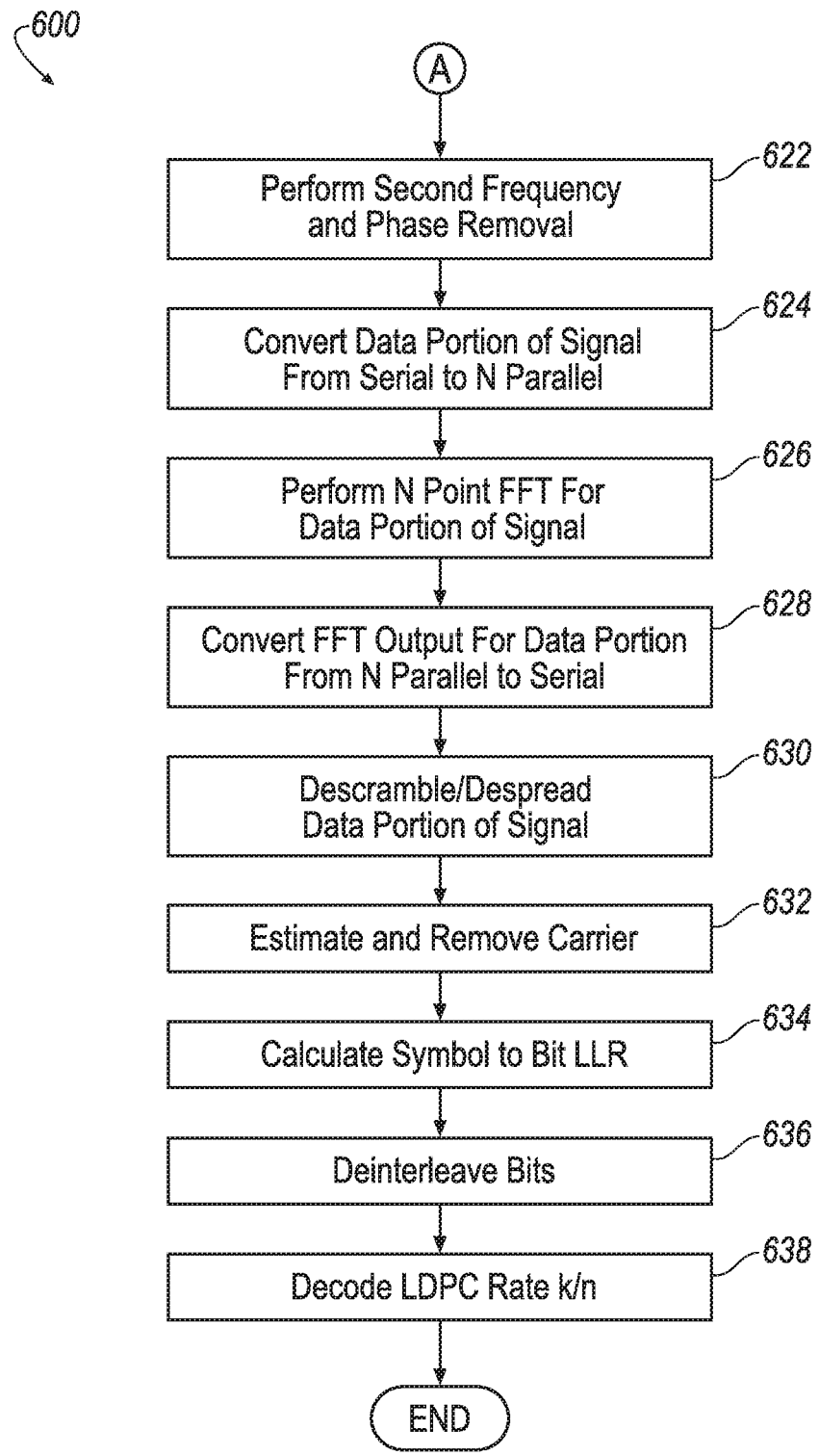

FIGS. 6a and 6b are a diagram of an exemplary process 600 for receiving a SCMA signal 300 via channel 114 including orthogonal frequency division multiplexing of the data portion 304 of the SCMA signal 300. The process 600 starts in a block 602.

In the block 602, the receiver 117 is programmed to receive the SCMA signal 300 from the transmitter 113 via the channel 114. The receiver 117 is further programmed to perform decimation filtering on the SCMA signal 300. The receiver 117 may be programmed to apply a polyphase filter structure. The filter coefficients may be selected to form a matched pair with the coefficients used at the transmitter 113, and can follow a root-raised cosine (RRC) shape with low rolloff values.

Additionally, in the block 602, the receiver 117 down samples the SCMA signal 300 to a sample rate of multiple samples per symbol. Upon applying the decimation filter function to the SCMA signal 300 and down sampling, the process 600 continues in a block 604.

In the block 604, the receiver 117 is programmed to adjust the gain of a receiver input applied to the SCMA signal, based on the amplitude of the UW from a previous transmission. Initially, the receiver 117 determines whether a peak amplitude of the UW from the previous transmission is within a predetermined range. The predetermined range may be a value or range of values. For example, in the case that the UW includes 512 symbols, the predetermined range may be a floating point value 512. The receiver 117 takes the amplitude of the UW, as determined in block 612. In a case that the UW amplitude is above the predetermined range, the receiver 117 decreases the gain. In a case that the UW amplitude is below the predetermined range, the receiver 117 increases the gain. The process 600 continues in a block 606.

In the block 606, the receiver 17 is programmed to determine the center frequency and bandwidth of frequency segments subject to interference. The bandwidth and center frequency of the frequency segments subject to interference may be determined by identifying power level peaks across the frequency range of interest. The receiver 117 is programmed to perform An M-point FFT to detect the existence of frequency segments subject to interference and their corresponding bandwidths. The receiver 117 checks the FFT output power level of each frequency bin. M is bigger than a burst length at multiple samples per symbol. The receiver 117 uses a threshold to decide which bins are overridden by the jamming signal. By identifying the interfered frequency bins, the receiver 117 also determines the center frequency of the frequency segments subject to interference.

Due to the nature of an FFT of limited time duration, the high power jamming signal can leak into the adjacent bins and hence a fixed threshold is not feasible. The receiver 117 is programmed to generate an adaptive threshold that varies with the jamming signal power. In order to adaptively determine the threshold, the receiver 117 will detect energy jumps of a smoothed FFT output of the SCMA signal 300. In the case of the presence of a jamming signal, the SCMA signal 300 received by the receiver 117 will include a jamming signal. The jamming signal will cause an energy jump at the frequency segments subject to interference in the smoothed FFT output.

The receiver 117 will base the adaptive threshold on the scaled average amplitude of the FFT bins before the positive energy jump (beginning of the frequency segments subject to interference) and after the negative jump (end of the frequency segments subject to interference) associated with the jamming signal. Upon identifying the frequency or frequency bands of jamming signals, the process 600 continues in a block 608.

In the block 608, the receiver 117 is programmed to filter out the frequency segments subject to interference identified in the block 606 from the SCMA signal 300. The receiver 117 applies a notch filter set for the center frequency and bandwidth of each frequency segment subject to interference in the SCMA signal 300.

The notch filter coefficients can be generated on-the-fly or pre-stored in the receiver memory. The granularity of the interference bandwidth which is normalized by the desired signal bandwidth is a tradeoff between complexity and performance. In order to apply a notch filter with specific normalized bandwidth to the interference at a specific frequency $F_{req\_interference}$, a first mixer may be applied by multiplying the received signal with $\exp(-j*2*pi*F_{req\_interference}*N*T_{sample})$ to the received signal such that the center frequency of the narrow band interference is at zero Hertz of the normalized notch filter. In this example, $F_{req\_interference}$ is the center frequency of the frequency segment subject to interference, N is the sample number which is 0, 1, 2, . . . , (Burst Length*SPS−1), SPS is samples per symbol, and $T_{sample}$ is the sample interval. Burst Length is the length of the SCMA signal 300 for the intended transmission.

After applying the notch filter, a second mixer is used to undo the first mixer by multiplying the filtered signal with exp (j*2*pi*$F_{req\_interference}$*N*$T_{sample}$). When there are more than one non-adjacent frequency segments subject to interference, the above process will be repeated until all of the frequency segments are filtered out.

As a result of applying the notch filter, the signal spectrum affected by the jammer as well as the jamming signal will be removed, causing a loss of the desired signal. The process 600 then continues in a block 610.

In the block 610, the receiver 117 detects a Unique Word (UW) in the received SCMA signal, with the jamming signal removed, as received from the block 608. The receiver 117 looks for a correlation of a portion of the received SCMA signal with a known UW. Polynomial fitting is used to find correlation peaks and fractional sample timing. The receiver is programmed to look for a maximum correlation above a correlation threshold. The location of the maximum correlation is used as the start of the burst location.

Upon identifying a portion of the received SCMA signal 300 with a correlation above a predetermined threshold with the known UW, the receiver 117 identifies the portion of the SCMA signal 300 as the UW. An example of detecting a UW, showing the effects of removing the jamming signal from the SCMA signal 300, is provided below with reference to the FIGS. 11a and 11b.

Based on the UW, the receiver 117 makes a first estimation of a carrier frequency and timing of the received SCMA signal 300. Upon making the first frequency and timing estimation, the process 600 continues in a block 612.

In the block 612, the receiver 117 determines a peak amplitude of the UW correlation and provides the peak value to the block 604 for gain adjustment. The process 600 continues in a block 614.

In the block 614, the receiver 117 makes a first frequency adjustment to the SCMA signal 300 as output from the block 608. The first frequency adjustment is for coarse frequency acquisition. Initially, the receiver 117 estimates the carrier frequency. The carrier frequency estimation is discrete Fourier transform (DFT) based. The determination of the DFT bin step is a tradeoff between performance and implementation complexity. The smaller the DFT step, the better the performance (accuracy of determining the base bandwidth center frequency) at the cost of implementation complexity. In order to make the implementation more practical, the DFT bin step needs to be as big as possible with acceptable performance loss.

For example, for an SCMA signal at 5.12 MHz symbol rate, in order to handle +/−50 kHz frequency offset, the number of bins for the DFT will be 23; the range is from −11 to 11. The residual frequency offset is half of the bin step 4.44e−4*512=0.223 in radians. This will cause the UW peak to degrade a little bit but still provide good performance. Based on the center frequency estimation, the receiver 117 makes the first frequency adjustment by removing the estimated carrier frequency from the SCMA signal 300. The process 600 continues in a block 616.

In the block 616, the receiver 117 adjusts the timing of receiver 117 relative to the SCMA signal 300 with the estimated carrier frequency removed. The process 600 continues in a block 618.

In the block 618, the receiver 117, based on the updated timing determined in the block 616, decimates the received SCMA signal 300, at a rate of one sample per symbol (1SPS). The process 600 then continues in a block 620.

In the block 620, the receiver 117 is programmed to perform descrambling, as is known, on the UW 302 and pilot symbols 306 of the SCMA signal 300, resulting in a version of the SCMA signal 300 including a descrambled UW 302 and descrambled pilot symbols 306. The receiver 117 may further be programmed to perform despreading. Upon performing the descrambling and despreading operations, the process 600 continues in a block 621.

In the block 621, the receiver 117 is programmed to perform a second frequency and phase estimation based on the descrambled and despread UW 302 and pilot symbols 306. The second frequency and phase estimation is for fine frequency and phase acquisition. The first frequency correction, performed in the block 616 is not sufficiently accurate to demodulate the data transmitted by the SCMA signal 300. With BPSK modulation and pilot spacing 12, the total burst length is 8366*4.44e−4=3.714 in radians, which is too much to demodulate the corrected symbols. The normalized frequency bin step for the second frequency correction is designed to be 8.138e−5. Six bins on the positive frequency side and six bins on the negative frequency side are used to cover 4.88-4 range which is about the maximum frequency error after the first frequency adjustment. Following the second frequency and phase estimation, the process 600 continues in a block 622.

In the block 622, the receiver 117 is programmed to perform a second frequency and phase removal. Following the second frequency and phase removal, the maximum residual frequency offset will be 4.078e−5; the maximum phase rotation caused by the second frequency offset is 0.34 in radians which is within half of the quadrant. Following the second frequency and phase adjustment, the process 600 continues in a block 624.

In the block 624, the receiver 117 is programmed to convert the data portion of the signal from serial to N parallel. The process 600 continues in a block 626.

In the block 626, the receiver 117 is programmed to perform an N point FFT for the data portion of the returned SCMA signal, as output from the block 624. The N point FFT removes the subcarriers from the data portion of the returned SCMA signal, leaving the data. The process 600 continues in a block 628.

In the block 628, the receiver 117 is programmed to convert the output of the N point FFT from N-parallel to serial. The process 600 continues in a block 630.

In the block 630, the receiver 117 is programmed to perform descrambling and/or despreading, as is known, on the data portion of the received SCMA signal, as output from the block 628. Upon performing the descrambling and/or despreading operation, the process 600 continues in a block 632.

In the block 632, the receiver 117 estimates and removes the carrier phase for the data portion of the SCMA signal, as output from the block 632. The process 600 continues in a block 634.

In the block 634, the receiver 117 is programmed to demodulate the data portion of the received SCMA signal. The demodulation may include BPSK or QPSK demodulation. The receiver 117 generates log-likelihood ratio (LLR) values of the received bits. Upon generating the LLR values, the process 600 continues in a block 636.

In the block 636, the receiver 117 is programmed to deinterleave the bits of the data portion of the received SCMA signal. The process 600 continues in a block 638.

In the block 638, the receiver 117 is programmed to decode the bits to retrieve estimates of the received information bits. The process 600 ends.

FIGS. 7a-7c are an example of single partial band jamming with 25% of 3-dB BW of the desired signal. The jamming to signal noise ratio (JSR) is 30 decibels (dB). FIG. 7a shows the desired signal 702 and the jamming signal 704 separately. FIG. 7b shows the superposition of the desired signal 702 and the jamming signal 704 to form the signal 706. FIG. 7c shows a plot 708 of the power spectrum density of the signal 706 after notch filtering.

Figures 8A, 8B, 8C:
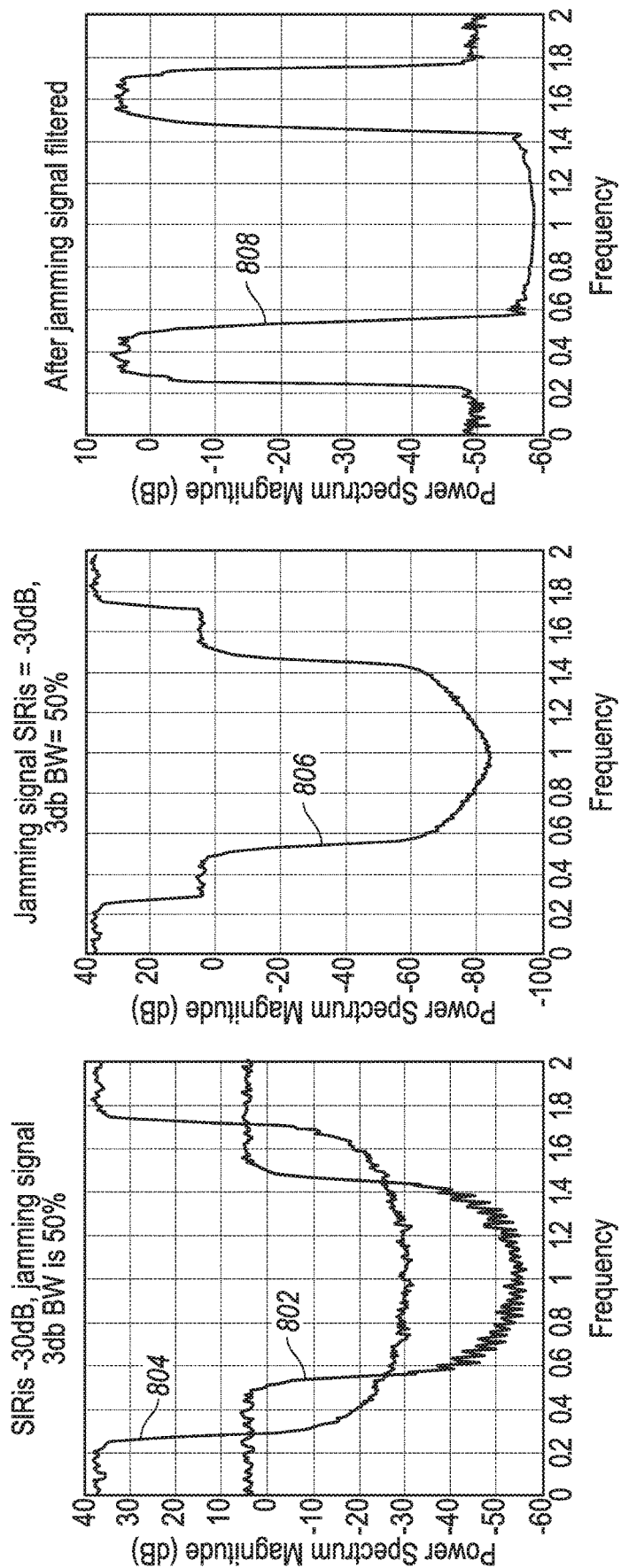

FIGS. 8a-8c are another example of single partial band jamming. In this example, the jamming BW is 50% of 3-dB BW of the desired signal. The jamming to signal noise ratio (JSR) is 30 dB. FIG. 8a shows the desired signal 802 and the jamming signal 804 separately. FIG. 8b shows the superposition of the desired signal 802 and the jamming signal 804 to form the signal 806. FIG. 8c is a plot of the power spectrum density of the signal 806 after notch filtering.

As described above with reference to the block 610 of the process 600, following the filtering out of the frequency segments subject to interference, the UW detection module will provide a first time and course frequency estimation. While the UW remains in the time domain, notch filtering will introduce inter symbol interference (ISI) even after perfectly removing the partial-band jamming signal. The amount of ISI introduced by the notch filter depends on its bandwidth.

Figure 9A:
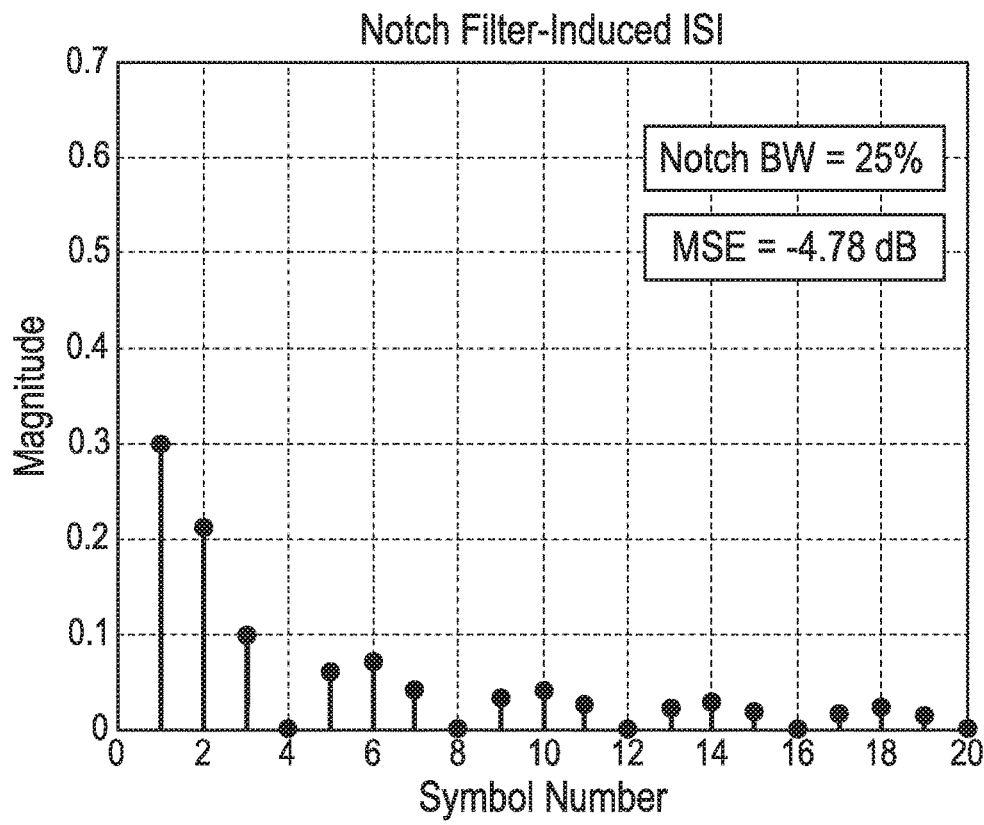
FIG. 9a is a graph showing exemplary notch-filter induced inter symbol interference.
Figure 9B:
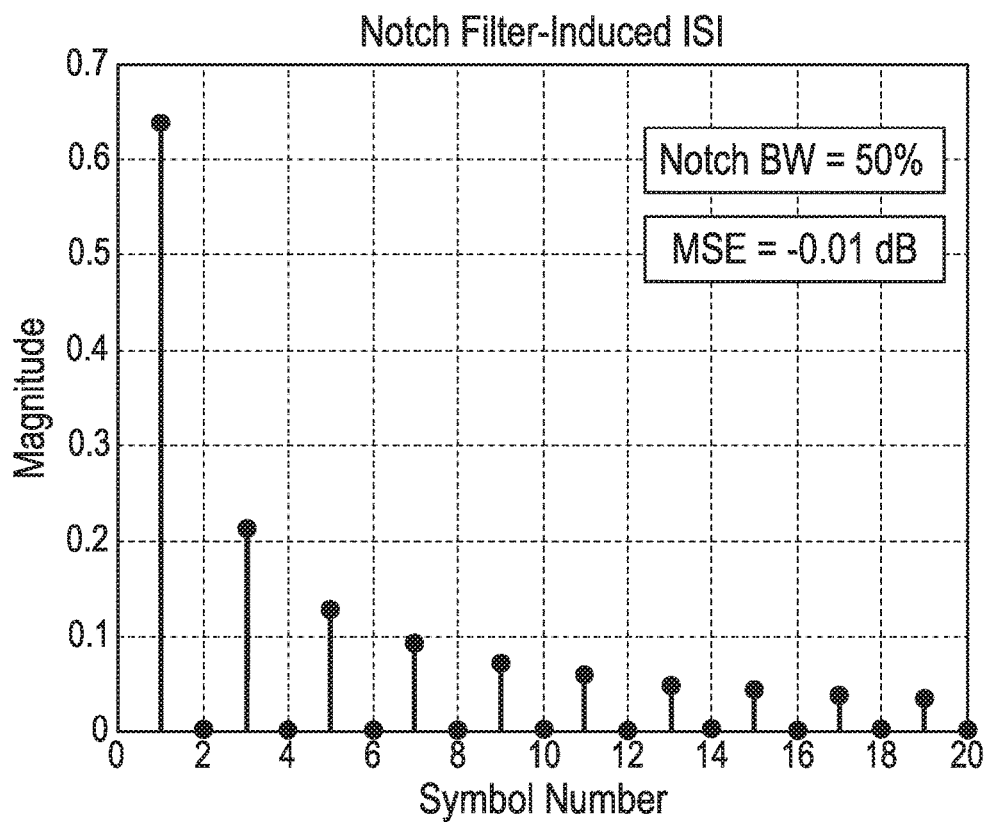
FIG. 9b is a graph showing exemplary notch-filter induced inter symbol interference.

FIGS. 9a and 9b display the profiles of the notch-filter induced ISI as it varies with the symbol index number, respectively for a notch filter bandwidth of 25% and a notch filter bandwidth of 50%.

Table 1, below, lists different signal to interference ratio (SIR) values at different notch filter bandwidths. Note that the values of SIR calculated via simulation, as listed in the table, are consistent with the mean-squared error (MSE) values analytically evaluated in FIGS. 9a and 9b.

TABLE 1

Notch filter-induced inter-symbol Interference

| Notch Filter signal BW | Inter symbol Interference power by notch filter | Signal power after notch filter | Calculated signal to interference ration (SIR) (dB) | Simulation mean-squared error (MSE) after demod (dB) |
|---|---|---|---|---|
| 5% | 0.05 | 0.95 | 12.79 | −12.50 |
| 10% | 0.10 | 0.90 | 9.54 | −9.45 |
| 25% | 0.25 | 0.75 | 4.77 | −4.79 |
| 50% | 0.50 | 0.50 | 0.00 | −0.06 |
| 75% | 0.75 | 0.25 | −4.77 | N/A |

Figure 10:
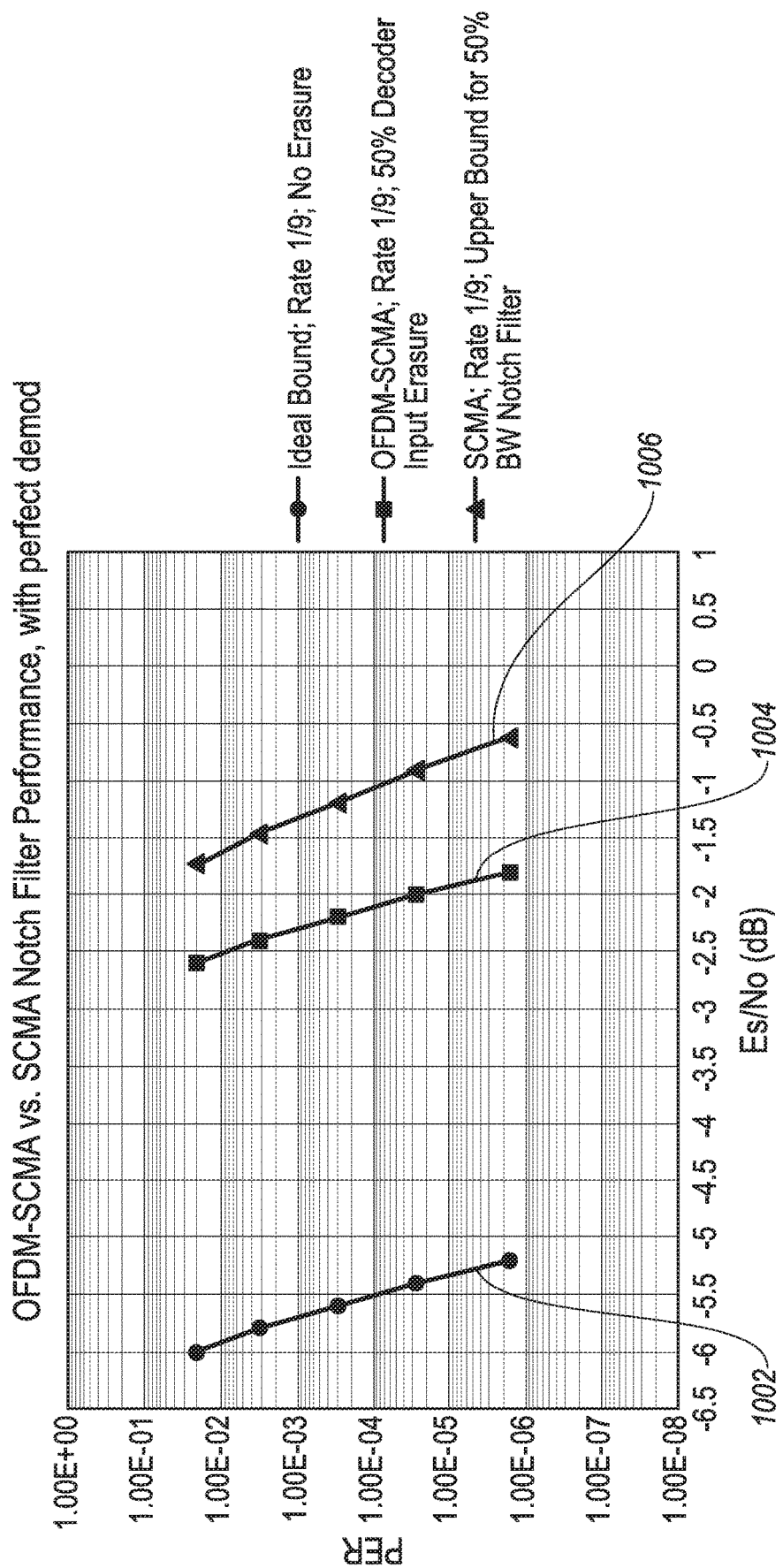
FIG. 10 is a graph of an exemplary simulation of the packet error rate (PER) performance as a function of energy per symbol to noise spectral density ($E_s/N_0$) for three transmission scenarios.

FIG. 10 shows the performance in terms of packet error rate (PER) as a function of the required signal to noise ratio (SNR). Es/No in dB, with code rate 1/9. Three cases are shown. The plot 1002 shows the ideal bound without any erasure. The plot 1004 shows an SCMA transmission with 50% erasure at its decoder input. The plot 1006 shows a conventional SCMA when subjected to the notch filter with 50% bandwidth. The OFDM-SCMA (plot 1004) has a large performance advantage relative to traditional SCMA (plot 1006) of about 1.2 dB at the target PER of 1E−05 when using code rate 1/9.

Traditional SCMA is based on single-carrier modulation where each symbol spans the entire signal bandwidth and a notch filter will introduce ISI in addition to signal power loss. In contrast, symbols in OFDM-SCMA scheme are localized based on the orthogonal narrowband subcarriers they modulate, and thus can be erased by a notch filter without introducing ISI. As shown earlier in FIGS. 7a and 7b, the notch filter introduces distortion in the form of ISI whose adverse impact on simulated PER performance is highlighted in FIG. 10 for the traditional SCMA system. This performance advantage of the proposed OFDM-SCMA system is expected to increase as the notch filter bandwidth is increased and/or the code rate is made higher for higher efficiency. This can be explained in the latter case as the operating SNR increases with increasing code rate, making the distortion more dominant relative to the background noise.

In order to mitigate the additional ISI during synchronization, it is necessary to increase the UW length. For example, traditional SCMA UW length equals to 256 for QPSK, which is a pseudorandom sequence designed for SNR as low as −5.5 dB. Doubling the UW length to 512 symbols for QPSK will lower the UW detection operation SNR to −8.5 dB. Worst case is rate 1/9 whose operation point is −5.5 dB, in order to ensure the SINR is not lower than −8.5 dB for UW detection, for 50% of notch-filter BW, the required SNR for reliable UW detection is −4.82 dB, which is much lower than the required SNR −2 dB for decoder with 50% erasure. For 75% notch filter BW, the required SNR for reliable UW detection is about 0 dB which is also higher than the decoder required SNR with 75% erasure. Therefore doubling the UW length will mitigate notch filter-introduced ISI and provide required UW detection performance under partial-band jamming circumstance.

TABLE 2

Required SNR for UW detection with 512 symbols.

| Notch Filter signal BW | final SINR (dB) | required SNR (dB) |
|---|---|---|
| 5% | −8.5 | −8.24 |
| 10% | −8.5 | −7.97 |
| 25% | −8.5 | −7.04 |
| 50% | −8.5 | −4.83 |
| 75% | −8.5 | −0.09 |

Figure 11A:
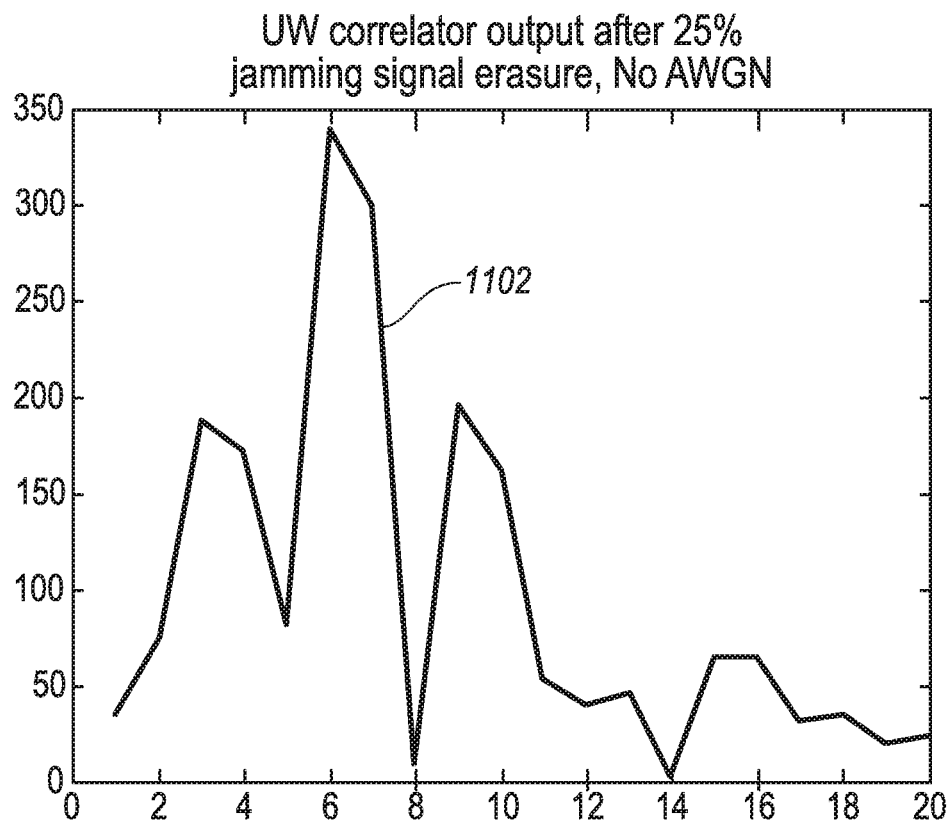
FIG. 11a is a graph of an exemplary unique word correlation.
Figure 11B:
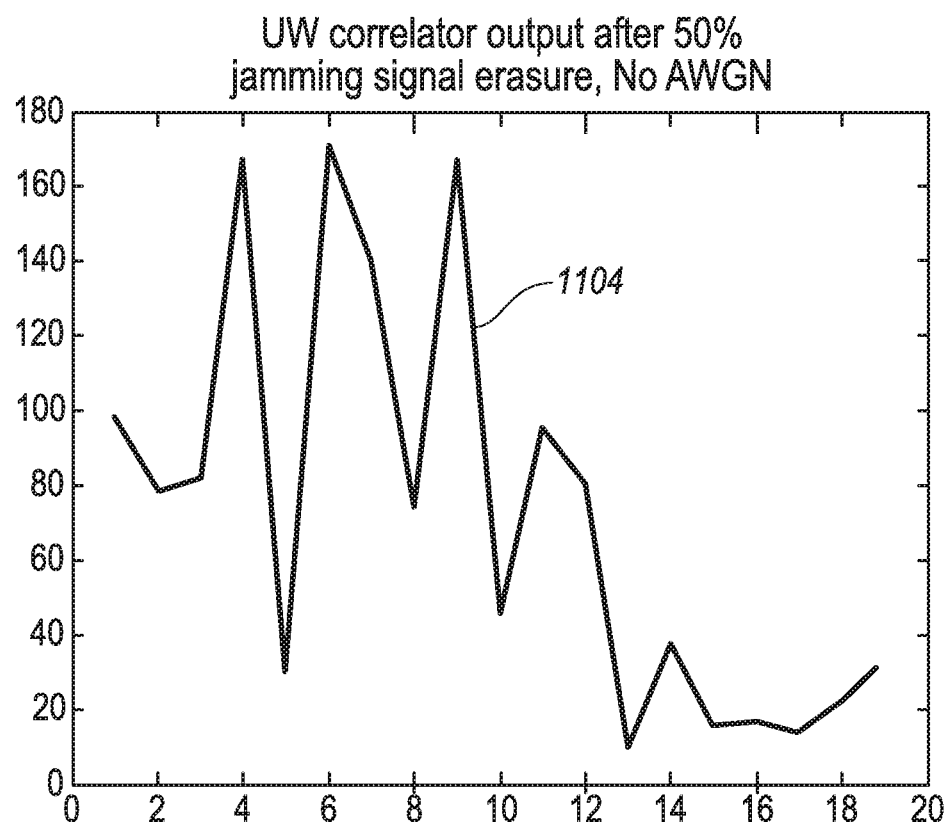
FIG. 11b is a graph of an exemplary unique word correlation.

The UW detector includes a UW correlator, peak search and parameter estimation. The task of the UW correlator is to correlate the received data against the known UW pattern, peak search is to find the location of peak value, while the parameter estimation provides time and coarse frequency offset estimation. For OFDM-SCMA, UW correlator is similar to traditional SCMA, except the UW length is increased. Parameter estimation is also the same as traditional SCMA. UW peak search for OFDM-SCMA is modified due to ISI caused by the notch filtering. The correlator amplitude output is not a single local peak because the energy of the real peak will leak into the adjacent symbols even without AWGN. The amount of leakage depends on the notch filter BW. FIGS. 11a and 11b give examples of how the notch filter will affect the 512-long UW correlator output. The x-axis is the sample index and the y-axis is the UW correlator amplitude output. In both cases, the real peak is at about the sixth sample.

The same rules apply to pilot spacing, more pilots or smaller pilot spacing is required with narrowband partial jamming. With more UW and pilots overhead, the parameter estimation will be more accurate at the cost of lower spectral efficiency. In practice, tradeoffs between performance and spectral efficiency need to be made.

The UW peak search for OFDM-SCMA looks for as many as three peaks of the UW correlator output. Polynomial fitting is used to find the real peaks and fractional sample timing. The location of the maximum of the three real peaks is used as the start of the burst location.

The received data will be further processed by removing coarse frequency and timing error, and then be decimated to one sample per symbol. Since OFDM signals are sensitive to fractional frequency error which introduces inter-carrier interference (ICI) between sub-carriers, fine frequency estimation based on descrambled/despread UW and pilots is necessary before the FFT. After fine frequency uncertainty is removed, the received data excluding pilots will be converted from serial to parallel (block 624), fast Fourier transformed (FFT) (block 626) and converted from parallel to serial (block 628) as described with reference to the process 600 (FIGS. 6a-6c). After carrier phase estimation and carrier phase removal, the demodulated symbols are converted to log-likelihood ratio (LLR), deinterleaved and the LDPC decoder will recover the original information sent by the OFDM-SCMA transmitter 113.

Figure 12:
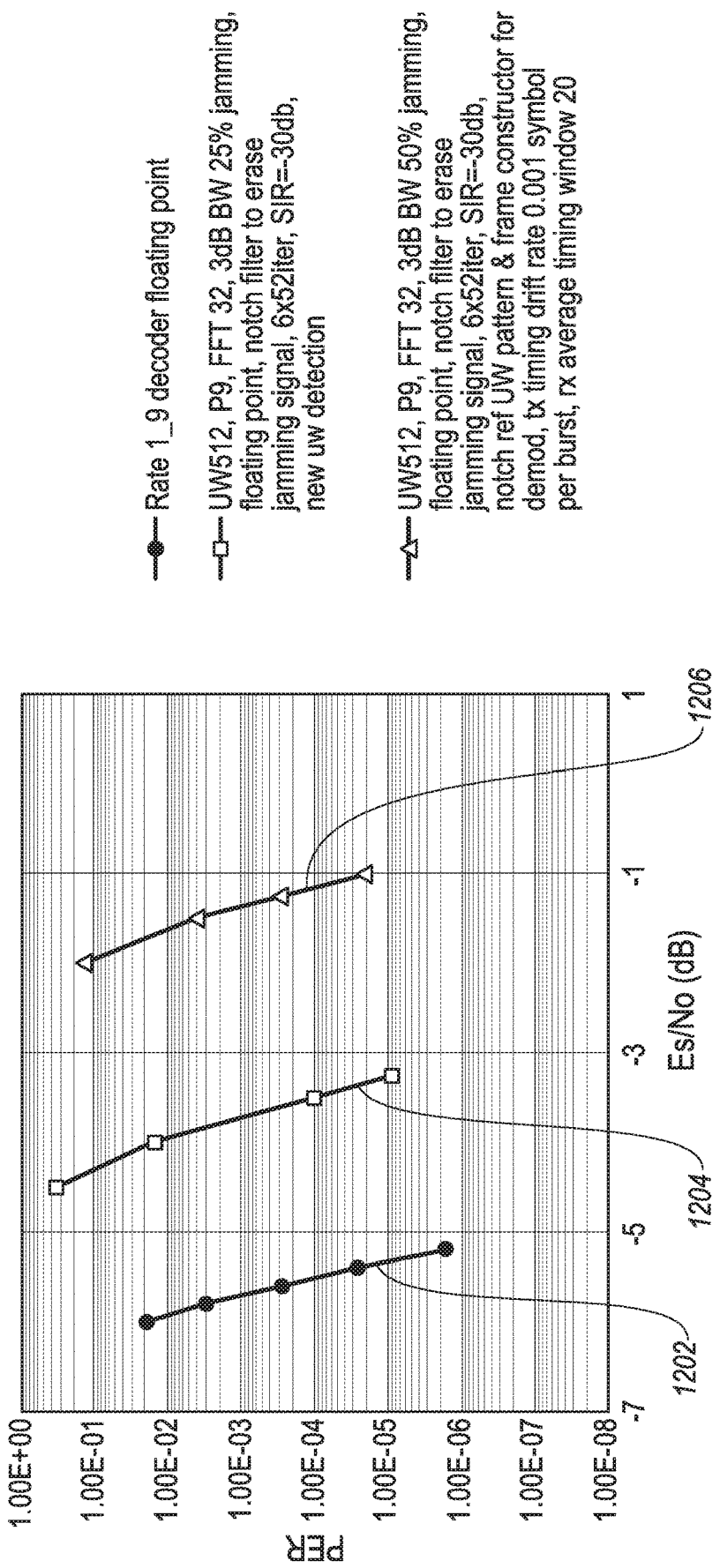
FIG. 12 is a graph of an exemplary simulation of the packet error rate (PER) performance as a function of energy per symbol to noise spectral density ($E_s/N_0$) for three transmission scenarios.

FIG. 12 shows the simulation result for rate 1/9 LDPC code, also, the JSR equals 30 dB, or SIR equals −30 dB, with 25% and 50% partial-band jamming bandwidth, pilot spacing is 9 and UW length is 512.

It must be noted that the jamming signal in the real world does not have a brick wall boundary in frequency domain, it will have skirts and some energy will leak into the less-affected adjacent frequency bands, shown in FIGS. 7a-7c and FIGS. 8a-8c. Therefore, it will be impossible to remove all the impact of the jamming signal. As a result performance curves of 25% and 50% jamming signal bandwidth exhibit different levels of steepness as that of the ideal performance curve using rate 1/9.

Under a severe narrowband jamming scenario, this invention will keep the communication link up by either increasing the transmitter power or reducing FEC code rate, or throughput, and finally recovering the transmitted information.

As can be seen in FIG. 12, a good communication link can be kept by increasing the signal power by several dB even with very high JSR. With a normal SCMA system, the power increase will be tens of dBs which is not practical in real system.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Python, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer, signal processor or the like. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with rules of holes, a RAM, a PROM, an EPROM, a FLASH-EEPROM, any other memory chip or cartridge, or any other medium from which a computer, signal processor, or the like can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a,"

"the," "said," etc. should be read to recite one or more of the indicated elements unless a claim recites an explicit limitation to the contrary.

The invention claimed is:

1. A transmitter, comprising a first signal processor programmed to:
   based on input serial data, generate, for each of an integer number of subcarriers mutually orthogonal to each other, a respective first data parallel stream;
   modulate a single carrier in a time domain, the single carrier occupying a same bandwidth as the integer number of subcarriers, with a unique word to generate a first signal, wherein the unique word includes a plurality of symbols modulated according to one of BPSK or QPSK modulation;
   modulate each of the integer number of subcarriers with the respective first data parallel stream in a frequency domain, while leaving the unique word and one or more pilot symbols in the time domain;
   serialize the integer number of data modulated subcarriers to generate a second signal in the time domain;
   combine the first signal in the time domain and the second signal including the integer number of subcarriers modulated by data in the frequency domain to generate a third signal;
   generate an output signal by applying a transmit filter to the third signal;
   generate, prior to modulating the integer number of subcarriers respectively with the respective first parallel data streams, a fourth signal including the input serial data and one or more pilot symbols;
   scramble the fourth signal to generate a fifth signal including one or more scrambled pilot symbols and scrambled input serial data;
   generate the respective first parallel data streams based on the scrambled input serial data from the fifth signal; and
   include in the third signal the one or more scrambled pilot symbols from the fifth signal, whereby the one or more scrambled pilot symbols modulate the single carrier, wherein the first signal processor is further programmed, when generating the third signal, to insert the one or more scrambled pilot symbols periodically within the input serial data, with a period of pilot symbol insertion based on at least one of: (1) an operating level of signal-to-noise ratio, (2) a modulation choice, (3) a spreading factor, (4) a jamming signal bandwidth, and (5) a jamming-to-signal ratio.

2. The transmitter of claim 1 wherein the first signal processor is further programmed to:
   transmit the output signal to a second signal processor.

3. The transmitter of claim 1, wherein the first signal processor is further programmed to modulate the integer number of subcarriers respectively with the respective first parallel data streams by applying an inverse fast Fourier transform (IFFT) to the integer number of first parallel data streams.

4. The transmitter of claim 1, wherein the first signal processor is further programmed to:
   scramble the input serial data prior to generating the respective first parallel data streams.

5. The transmitter of claim 1, wherein applying the transmit filter includes applying an interpolation filter.

6. The transmitter of claim 1, wherein:
   the one or more pilot symbols are modulated according to one of BPSK and QPSK modulation.

7. The transmitter of claim 1, the first signal processor is further programmed to specify a length of the unique word based on at least one of: (1) an operating level of signal-to-noise ratio, (2) a modulation choice, (3) a spreading factor, (4) a jamming signal bandwidth, and (5) a jamming-to-signal ratio.

8. The receiver of claim 1, wherein the signal processor is further programmed to perform the second carrier frequency removal prior to extracting the first parallel data streams respectively from the integer number of data-modulated subcarriers to generate N parallel data streams.

9. The transmitter of claim 1, wherein each of the one or more pilot symbols has a respective value that is predefined and stored in respective memories of the transmitter and a receiver.

10. The transmitter of claim 1, wherein the unique word is a sequence of the plurality of symbols.

11. A receiver, comprising a signal processor programmed to:
    receive a first signal including a unique word and one or more pilot symbols modulating a single carrier, and an integer number of data-modulated subcarriers mutually orthogonal to each other, each of the integer number of data-modulated subcarriers including a subcarrier modulated by a respective first parallel data stream, wherein the integer number is a number of subcarriers included in the single carrier;
    determine a frequency segment of the first signal subject to interference;
    generate a second signal by filtering out the frequency segment of the first signal subject to interference;
    detect the unique word in the second signal with the frequency segment subject to interference filtered out based on a correlation between a known unique word and portion of the second signal above a correlation threshold;
    estimate a first carrier frequency for the second signal based on the unique word;
    remove the estimated first carrier frequency from the second signal;
    descramble, after removing the estimated first carrier frequency, the unique word; and the one or more pilot symbols;
    perform a second carrier frequency estimation and removal based on the unique word and one or more pilot symbols; and
    extract the first parallel data streams respectively from the integer number of data-modulated subcarriers.

12. The receiver of claim 11, wherein:
    the signal processor is further programmed to apply a notch filter to filter out the frequency segment of the first signal subject to interference, including:
      determining a center frequency and bandwidth of the frequency segment subject to interference; and
      matching a center frequency and bandwidth of the notch filter to the center frequency and bandwidth of the frequency segment.

13. The receiver of claim 11, wherein the signal processor is further programmed to extract the first parallel data streams respectively from the integer number of data modulated subcarriers by applying a fast Fourier transform (FFT) to each of the integer number of data modulated subcarriers.

14. The receiver of claim 11, wherein the signal processor is further programmed to:
    combine the extracted first parallel data streams to form a serial data stream; and
    descramble the serial data stream.

15. The receiver of claim 11, wherein the signal processor is further programmed to adjust a gain of a receiver input based on an amplitude of the unique word in the second signal.

16. The receiver of claim 11, wherein the signal processor is further programmed to determine the frequency segment of the first signal subject to interference by determining an adaptive threshold based on an amplitude of at least one frequency segment of the first signal not subject to interference and an amplitude of the frequency segment of the first signal subject to interference.

17. A system, comprising a transmitter and a receiver,
the transmitter including a first signal processor programmed to:
based on input serial data, generate, for each of an integer number of subcarriers mutually orthogonal to each other, a respective first parallel data stream;
modulate a single carrier in a time domain, the single carrier occupying a same bandwidth as the integer number of subcarriers, with a unique word and one or more pilot symbols to generate a first signal;
modulate each of the integer number of subcarriers with the respective first data parallel stream in a frequency domain, while leaving the unique word and one or more pilots symbols in the time domain;
serialize the integer number of data modulated subcarriers to generate a second signal in the time domain;
combine the first signal and the second signal to generate a third signal;
generate an output signal by applying a transmit filter to the third signal; and
the receiver including a second signal processor programmed to:
receive the output signal including the unique word and one or more pilot symbols modulating the single carrier, and the integer number of data-modulated subcarriers mutually orthogonal to each other, each of the integer number of data-modulated subcarriers including the subcarrier modulated by the respective first parallel data stream, wherein the integer number is a number of subcarriers included in the single carrier;
determine a frequency segment of the output signal subject to interference;
generate a fourth signal by filtering out the frequency segment of the output signal subject to interference;
detect the unique word in the fourth signal with the frequency segment subject to interference filtered out based on a correlation between a known unique word and a portion of the fourth signal above a correlation threshold;
estimate a first carrier frequency for the fourth signal based on the unique word;
remove the estimated first carrier frequency from the fourth signal;
descramble, after removing the estimated first carrier frequency, the unique word and the one or more pilot symbols;
perform a second carrier frequency estimation and removal based on the unique word and one or more pilot symbols; and
extract the integer number of first parallel streams respectively from the N data modulated subcarriers.

* * * * *